Figure 1:
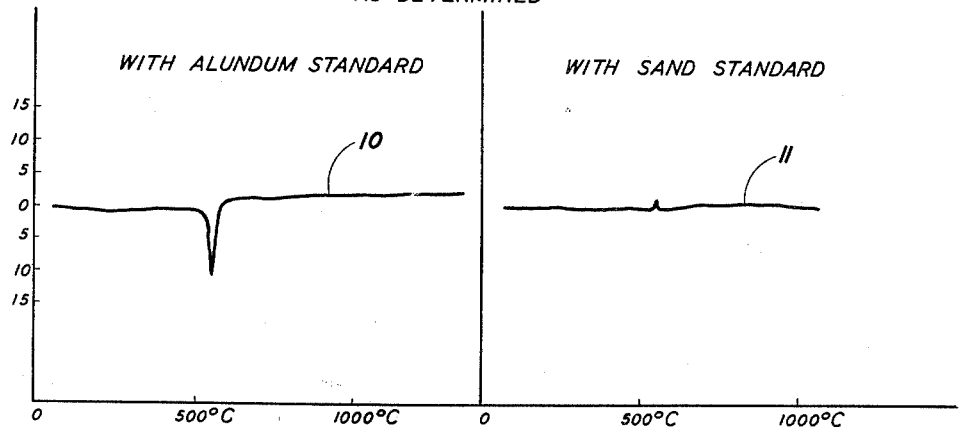

April 5, 1955     P. C. ROMO ET AL     2,705,417
MINERALOGICAL ANALYSIS
Filed Dec. 21, 1951     2 Sheets-Sheet 1

INVENTORS.
PAUL C. ROMO
THOMAS W. LYNCH
BY
*James B. Christie*
ATTORNEY

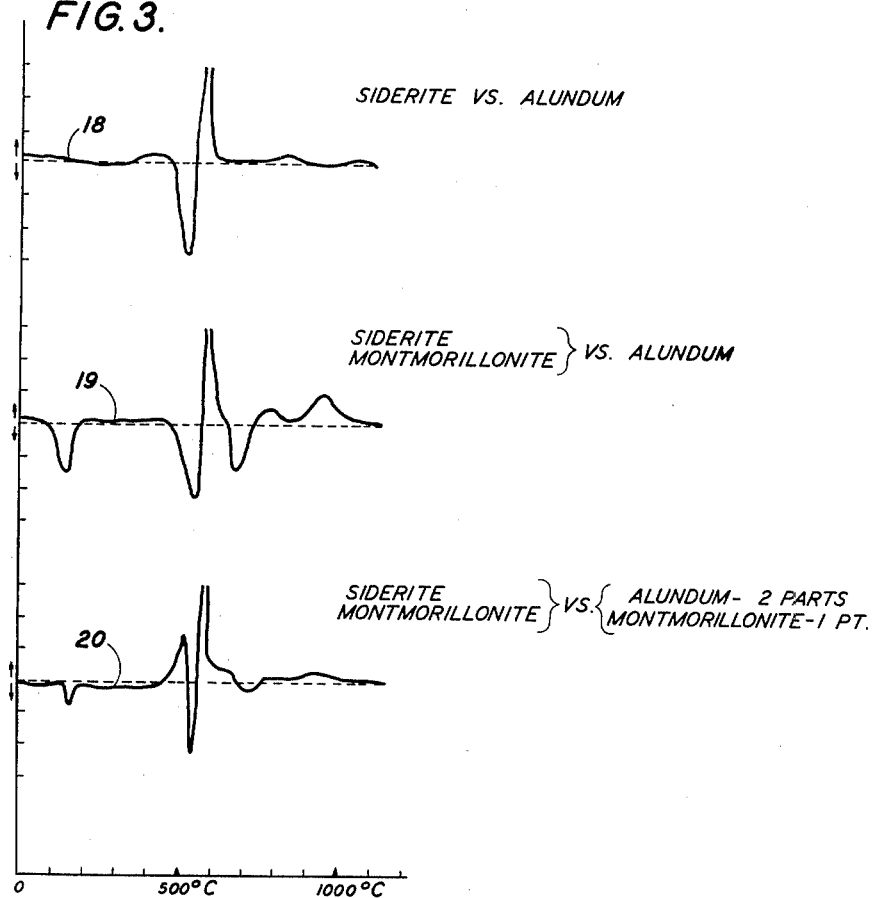

United States Patent Office 2,705,417
Patented Apr. 5, 1955

2,705,417

MINERALOGICAL ANALYSIS

Paul C. Romo and Thomas W. Lynch, Los Angeles, Calif., assignors to Petroleum Engineering Associates, Inc., Pasadena, Calif., a corporation of California Application December 21, 1951, Serial No. 262,864

10 Claims. (Cl. 73—15)

This invention relates to mineralogical analysis and particularly to improvements in the analytical technique commonly referred to as "differential thermal analysis."

Differential thermal analysis has found extensive use as a rapid method of identifying certain components of a mineral sample and for approximating the concentration of such components in the sample. This method of analysis is very helpful, for example, in well logging techniques for identifying the mineralogical characteristics of strata traversed by a well bore. The technique comprises generally plotting graphically the thermal effects of a sample as compared to a reference standard as the sample and standard are simultaneously heated through a broad temperature range. The appearance, sequence and magnitude of characteristic endothermic or exothermic induced temperature differentials between the sample and reference standard as they are heated through this range provide a basis for the identification of the responsible thermally active mineral constituents in the sample and the amplitude and duration of such deviation provides a quantitative estimation of the concentration of such constituents. In accordance with present practice a thermally inert standard such as aluminum oxide, i. e. Alundum, is employed which does not exhibit any thermal activity throughout the temperature range of interest. With such a standard any observed temperature differentials are as a consequence of thermally active components in the sample.

Such factors as drift and differences in thermal conductivity between the sample and the reference standard inherently occur during the course of the comparative measurements thereby interfering with the precise measurements of peak heights and areas so that quantitative estimates are only correct within 5% or 10%, at best. Several factors are important in causing drift in the curve from the base line of no thermal activity. These are listed as follows:

1. The use of differential thermocouples, the position of which is off center in relation to the standard or the sample or to both.

2. The use of differential thermocouples whose components are unmatched either in their make up or by contamination. In such situation, the standard couple may yield a greater e. m. f. than the sample couple and the difference may not be linear over the usual temperature range.

3. Differences in thermal conductivity between the sample and the reference standard as inherently existing or as resulting from the occurrence of a reaction or reactions during the run.

Factors 1 and 2 may be eliminated or effectively reduced by diligence in the uniform packing of the sample and the standard reference around the respective couples and the precise make up of differential thermocouples by spot welding techniques.

I have now developed an improved method of differential thermal analysis directed specifically to elimination or substantial reduction of the errors resulting from the third of the factors discussed above, which method differs principally from the conventional procedures by comparing the thermal reactions of the sample to be analyzed to a standard reference containing one or more of the thermally reactive components previously ascertained to exist in the sample to be analyzed. For example, it is a common occurrence when a sample, whose exact make up is unknown, is analyzed that an exothermic reaction may take place during an endothermic reaction or during a different exothermic reaction and in the same sample an endothermic reaction may take place during another endothermic reaction or during an exothermic reaction. The complexity of the resulting thermal curve due to these simultaneous net or additive heat effects may be such as to render an intelligible interpretation impossible. However, if a reference standard is used in accordance with the present invention to minimize or cancel out the heat effects of obvious or known constituents in a sample to be analyzed, the interpretation of the curve is simplified in that the identifying peaks of unknown constituents are not obscured by the thermal effects of the known constituents which are also included in the standard reference. In addition, when the thermal effects of the standard reference are known then the direction of these peaks as well as the peak heights on the resultant comparison curve may be used to estimate quantitatively the amount of the same constituents in the unknown relative to the amount thereof in the standard.

The method of the invention in addition to facilitating mineral identification has the further advantage in that inherent differences in thermal conductivity between the sample and the standard reference are minimized since the standard reference approaches to some extent the same thermal pattern as the sample to be analyzed. As a consequence quantitative estimation of composition is more reliable.

In differential thermal analysis involving the comparative measurement of thermal reactions taking place in a sample to be analyzed and a standard sample while gradually and simultaneously heating the samples to an elevated temperature, the invention contemplates the improvement which comprises determining in advance the presence of at least one thermally reactive componuent of the sample to be analyzed, and compounding the standard sample to contain said component or components whereby the thermal effects of any other thermally reactive components in the sample to be analyzed may be more readily determined.

The invention also comprehends, as a refinement, preparation of the standard reference sample so as to contain the known components of the sample in proportion approximating that of the sample. In this manner the resultant thermal curve is further simplified and the concentration of these known constituents in the sample can be more accurately determined.

In preferred practice, differential thermal analysis is carried out in the following manner. The sample to be analyzed, if likely to contain hydrocarbons as is frequently the case in well logging samples, is leached with an organic solvent to remove the hydrocarbons. The leached sample or an unleached sample if leaching is not necessary is then dried and crushed conveniently to minus 100 mesh to complete its preparation.

The sized sample is placed in one compartment of a nickel block which includes two additional identical compartments. A standard reference sample according to the invention is placed in one of the compartment and preferably a thermally inert material is placed in the third compartment. Three sets of thermocouples are inserted in these compartments to enable measurement of the temperature of the material in the third one of the compartments and the temperature difference between the sample and the reference standard in the other two of the compartments. The nickel block and its contents are then heated at a uniform temperature from about 100° centigrade or from ambient temperature to about 1000° centigrade or higher. The difference in temperature between the sample and the standard reference is sensed. When no temperature differences exist the recorded line does not deviate from a norm which is conveniently oriented as the center line of a recording chart. When an endothermic or exothermic reaction occurs in the sample the occurrence of which is not matched by a like reaction in the standard reference the recorded line deviates from the norm in a direction characteristic of the type of reaction.

The temperature or temperatures at which an endothermic or exothermic reaction or combination of such reactions occur and the magnitude of such reactions as reflected in the amplitude and duration of trace deviation or peak serve to identify the components of the sample qualitatively and quantitatively. When comparing the sample with a reference standard likewise containing a thermally reactive material in known concentration and hence of known thermal effect, the absence of a deviation in the temperature curve characteristic of the activity of such known material, is of course, indicative of the existence of such material in the sample.

Figure 2:
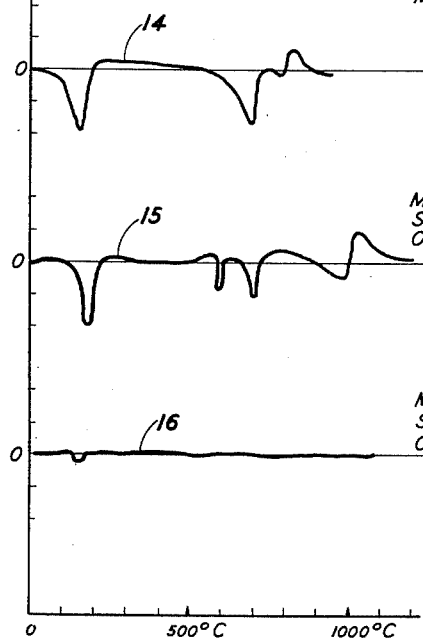

The importance of the present invention in expanding the usefulness of differential thermal analysis will be apparent from the following description of the accompanying drawings, in which:

Fig. 1 shows typical differential thermal analysis curves, commonly referred to as thermal curves, as obtained by comparison of sand as the sample to be analyzed with thermally inactive Alundum in one case and with a sand reference standard in the other;

Fig. 2 shows three thermal curves obtained respectively by the comparison of montmorillonite as against thermaly inactive Alundum, as obtained by the comparison of a mixture of montmorillonite, sand and oxidizable iron against thermally inactive Alundum and as obtained by the comparison of a similar sample mixture against a reference standard of approximately the same composition as the sample; and Fig. 3 shows three thermal curves obtained respectively from the comparison of siderite with thermally inactive Alundum; from the comparison of a sample comprising a mixture of siderite and montmorillonite as against thermally inactive Alundum; and, from the comparison of a sample comprising a mixture of siderite and montmorillonite as against a reference standard comprising Alundum and montmorillonite in the ratio of two to one.

Referring to Fig. 1 of the drawing, two graphs are there shown representing in each case a thermal curve plotted against temperature in degrees centigrade from 100° C. to 1000° C., the abscissa representing arbitrary chart units of deviation. In practice temperature differentials are sensed in microvolts of unbalance signal developed at the two differentially arranged thermocouples. This unbalance signal is amplified and recorded as the thermal curve, the abscissa of which represents microvolts times the gain of the amplifier system.

Curve 10 of the figure is that derived from a thermal comparison of a sand sample with an Alundum standard by the method heretofore described. The alpha to beta quartz reaction which in the sand sample is extremely pronounced takes place at a temperature between about 570° C. and 580° C. Subsequent to this pronounced deviation it is noted that the recorded trace does not return to the norm or base line as a consequence of a change of heat conductivity of the sample. This drift is, of course, objectionable as resulting in an error factor both in the interpretation of the single deviation occurring in this instance and in the interpretation of additional deviations in the event that the sand sample contained any thermally active impurities. Curve 11 of Fig. 1 shows a recorded trace as obtained with a sand sample as compared to a sand standard reference. The trace 11 is essentially a straight line following the norm or base line. The slight exothermic pip in the region of about 575° C. indicates only that the standard thermocouple is slightly more sensitive than the sample couple. In spite of this inequality no discernible shift is apparent in the alpha to beta quartz change, such uniformity clearly facilitating the detection of impurities in the sand sample if there had been any.

Fig. 2 shows additional thermal curves clearly representing the improvements resulting from the practice of the invention. Here again the curves are plotted against temperature in degrees centigrade from about 100° to about 1000° along parallel hypothetical base lines or norms identified on the abscissa as zero units. The curve 14 is typical of that obtained from the thermal comparison of montmorillonite (Wyoming bentonite) with Alundum. The pronounced deviation at the temperature of about 150° C. is representative of loss of water. At about 690° C. the montmorillonite undergoes an endothermic reaction involving partial destruction of the lattice structure with loss of hydroxyl water. In the region of about 800° C. there is a minor endothermic reaction followed by a more pronounced exothermic reaction in which the lattice structure of the clay is completely destroyed forming a spinel-like structure.

When sand and oxidizable iron are mixed with montmorillonite and thermally compared with Alundum the thermal curve 15 is obtained. This curve is complicated by the exothermic alpha to beta quartz reaction of the sand (see Fig. 1) and the oxidation of the iron. Curve 16 in Fig. 2 shows results of comparing a mixture of montmorillonite, sand and oxidizable iron with the same mixture used as a reference standard. The resultant curve, as expected from the foregoing description of the invention, is essentially a straight line, with the reactions in the sample and in the standard cancelling each other.

In Fig. 3, curve 18 is that obtained in the thermal comparison of siderite (ferrous carbonate) and Alundum. The siderite exhibits violent endothermic and exothermic reactions between about 520° C. and 570° C. produced respectively by decomposition of ferrous carbonate to ferrous oxide and oxidation of the latter to ferric oxide. When siderite and montmorillonite are mixed as the sample to be analyzed and compared with Alundum, curve 19 is obtained. In this curve endothermic breakdown of montmorillonite follows the exothermic oxidation reaction of the siderite, the two peaks overlapping to a certain extent making accurate resolution thereof difficult. Curve 20 was obtained by comparing a sample comprising a mixture of siderite and montmorillonite against a reference standard comprising Alundum and montmorillonite in the ratio of two parts to one respectively. In this manner the montmorillonite reaction is substantially obscured. As a consequence the content of both siderite and montmorillonite in the sample is more accurately determinable. Appearance of any montmorillonite peak in the curve 20 is due to a somewhat larger quantity of montmorillonite in the sample than in the reference standard, it being possible in calibration to ascertain the apparent difference in montmorillonite concentration.

Mention was heretofore made of a third compartment in the nickel block employed for measuring the gradual temperature rise of the samples contained in the two other compartments in the block. A thermally inert material such as Alundum is preferred for this purpose. If desired, the compounded reference standard in accordance with the invention may be used since the deviations of this standard from a norm in most instances are predetermined and hence would not interfere with the temperature measurement.

The method of analysis herein described is particularly adapted to industrial purposes and product quality control in which it is desired to produce a product or material of a specified composition. Representative samples of the product may be compared against a standard of the desired composition and thereby quickly evaluated. Any deviation of the recorded trace in such a comparison will indicate a deviation of the product from the standard, the extent of the deviation being controlling as to whether the product should be rejected.

As a further application, the method may be used in prospecting wherein the material sought may be used as a reference standard and prospect samples quickly checked against this material to ascertain similarities and dissimiliarities.

The evaluation of a series of samples from oil sands is conveniently made by using a sand-feldspar mixture as a reference standard, these components being generally present in any oil sands, whereby the resultant thermal curve constitutes a clear representation of any impurities or unknown constituents in the sand sample. In addition, it may be desirable to prepare a coded background curve to be superimposed on any thermal curves obtained by comparing a sample with a compounded reference standard, the coded background curve serving to give a visual indication of the composition of the sample insofar as it deviates from the reference standard. This technique is very helpful in well logging wherein ditch cuttings are analyzed in accordance with the method of the invention.

We claim:

1. In differential thermal analysis involving the comparative measurement of thermal reactions taking place in a sample to be analyzed and a standard sample while gradually and simultaneously heating the samples to an elevated temperature, the improvement which comprises determine in advance the presence of at least one thermally reactive component of the sample to be analyzed, and compounding the standard sample to contain said component whereby a thermal effect of any other thermally reactive components occurring at substantially the same temperature in the sample to be analyzed may be more readily determined.

2. In differential thermal analysis involving the comparative measurement of thermal reactions taking place in a sample to be analyzed and a standard sample while gradually and simultaneously heating the samples to an elevated temperature, the improvement which comprises determining in advance the presence of at least one thermally reactive component of the sample to be analyzed, and compounding the standard sample to contain a predetermined amount of said component whereby any difference in thermal effect of said component in the standard sample and in the sample to be analyzed provides a measure of the concentration thereof in the sample to be analyzed.

3. In differential thermal analysis involving the comparative measurement of thermal reactions taking place in a sample to be analyzed and a standard sample while gradually and simultaneously heating the samples to an elevated temperature, the improvement which comprises determining in advance the presence and approximate concentration of at least one thermally reactive component of the sample to be analyzed, and compounding the standard sample to contain said component in proportion approximating that of its appearance in the sample to be analyzed whereby the like thermal effect of said component is suppressed and the thermal effect of any other thermally reactive component in the sample to be analyzed occurring at substantially the same temperature may be more readily determined.

4. In differential thermal analysis involving the comparative measurement of thermal reactions taking place in a sample to be analyzed and a standard sample while gradually and simultaneously heating the samples to an elevated temperature, the improvement which comprises determining in advance the presence of the principal thermally reactive components of the sample to be analyzed, and compounding the standard sample to contain said principal components whereby the thermal effect of any other thermally reactive components in the sample to be analyzed may be more readily determined.

5. In differential thermal analysis involving the comparative measurement of thermal reactions taking place in a sample to be analyzed and a standard sample while gradually and simultaneously heating the samples to an elevated temperature, the improvement which comprises determining in advance the presence and approximate concentration of the principal thermally reactive components of the sample to be analyzed, and compounding the standard sample to contain said principal components in proportion approximating that of their occurrence in the sample to be analyzed whereby the thermal effect of any other thermally reactive components in the sample to be analyzed may be more readily determined.

6. In prospecting for minerals of particular composition involving the testing of mineral samples in which the principal components of said particular composition are known to exist to an unknown degree, the method which comprises preparing standard samples of particular composition having the same ingredients in the same proportions as the particular composition being sought, comparing the thermal activity of the mineral samples and the standard samples by heating each mineral sample simultaneously with a standard sample to an elevated temperature and sensing any temperature differentials between the mineral sample and standard sample whereby similarities and dissimilarities of the mineral sample and standard sample are determined.

7. In oil well logging involving sampling the strata traversed by the well bore and identifying the characteristics of the strata samples thus obtained, the method which comprises preparing standard samples of known composition comprising a mixture of sand and feldspar, separately comparing the thermal activity of each strata sample and a standard sample by simultaneously heating the strata sample and standard sample to an elevated temperature, and sensing any temperature differentials in the strata sample and standard sample whereby deviation of the strata sample from the composition of the standard sample may be determined.

8. In quality control of mineralogical products of predetermined desired composition, the method which comprises preparing a standard sample known to contain the same ingredients and proportions as the desired composition, comparing the thermal activity of a sample of said product and the standard sample by simultaneously heating the sample of said product and a standard sample to an elevated temperature, and sensing any temperature differential between the sample of said product and a standard sample whereby the appearance of such differential will establish a deviation of said product from the desired composition.

9. A method for quantitative analysis of mineral samples involving the comparative measurement of thermal reactions taking place in a mineral sample to be analyzed and a standard sample of known composition compounded of some of the components of the mineral sample, comprising compounding the standard sample from said components in the proportions estimated to occur in the mineral sample, the simultaneous heating of the mineral sample and the standard sample, and measuring the thermal effects resulting from the heating wherein the absence of differential thermal effects will indicate the composition of the mineral sample from the known composition of the standard sample.

10. A method for quantitative analysis of mineral samples involving the comparative measurement of thermal reactions taking place in a mineral sample to be analyzed and a standard sample of known composition compounded of some of the estimated components of the mineral sample, comprising compounding the standard sample from said components in the proportions estimated to occur in the mineral sample, the simultaneous heating of the mineral sample and the standard sample and measuring the thermal effects resulting from the heating wherein the absence of differential thermal effects will indicate the composition of the mineral sample from the known composition of the standard sample, successive standard samples of varying composition being used to seek the standard which approximates the composition of the mineral sample most closely, as indicated by the absence of differential thermal effects.

References Cited in the file of this patent

UNITED STATES PATENTS

| 1,558,828 | Brace | Oct. 27, 1925 |
| 2,264,968 | De Forest | Dec. 2, 1941 |

OTHER REFERENCES

Reports of Investigations, "Differential Thermal Analysis of Quartz," Dept. of Interior, R. I. 3763, July 1944.

"Applications of Thermal Analysis to Clays and Aluminous Minerals," R. I. 3764, July 1944.